United States Patent
Starkey et al.

(10) Patent No.: US 7,930,268 B2
(45) Date of Patent: Apr. 19, 2011

(54) WORKFLOW METHOD, SYSTEM, AND DATA STRUCTURE

(75) Inventors: Michael Starkey, British Columbia (CA); Jiang Bol Xue, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 407 days.

(21) Appl. No.: 12/108,711

(22) Filed: Apr. 24, 2008

(65) Prior Publication Data

US 2008/0270477 A1 Oct. 30, 2008

(30) Foreign Application Priority Data

Apr. 29, 2007 (CN) .......................... 2007 1 0107747

(51) Int. Cl.
*G06F 7/00* (2006.01)
*G06F 17/30* (2006.01)
(52) U.S. Cl. ............. 707/608; 707/791; 705/9; 705/301
(58) Field of Classification Search .................. None
See application file for complete search history.

(56) References Cited

U.S. PATENT DOCUMENTS

| | | | | |
|---|---|---|---|---|
| 7,371,068 | B2 * | 5/2008 | Lloyd et al. | 434/262 |
| 7,664,729 | B2 * | 2/2010 | Klein et al. | 707/791 |
| 2003/0126148 | A1 * | 7/2003 | Gropper et al. | 707/100 |
| 2004/0122701 | A1 * | 6/2004 | Dahlin et al. | 705/2 |
| 2004/0249677 | A1 * | 12/2004 | Datta et al. | 705/3 |
| 2005/0027578 | A1 | 2/2005 | Chambers, Jr. et al. | |
| 2006/0026166 | A1 | 2/2006 | Sattler et al. | |
| 2006/0064328 | A1 * | 3/2006 | Datta et al. | 705/3 |
| 2006/0235936 | A1 * | 10/2006 | Lei et al. | 709/208 |
| 2007/0038496 | A1 | 2/2007 | Parvatikar et al. | |
| 2007/0198329 | A1 * | 8/2007 | Lyerly et al. | 705/11 |
| 2007/0288212 | A1 * | 12/2007 | Messmer et al. | 703/6 |

OTHER PUBLICATIONS

Cozzi et al.; Activity management as a Web service; IBM Systems Journal, vol. 45, No. 4; 2006; pp. 695-712.

* cited by examiner

*Primary Examiner* — Pierre M Vital
*Assistant Examiner* — Loan T Nguyen
(74) *Attorney, Agent, or Firm* — Schmeiser, Olsen & Watts; John Pivnichny

(57) ABSTRACT

A method, system, and data structure for implementing a workflow. The workflow divides a general work task of an enterprise into activities and associated relationships with respect to participating roles in the workflow. A checklist file is generated for each participating role. Each checklist file is stored in a first database. Each checklist file specifies activities of each participating role and at least one relationship element for each activity of each participating role. The at least one relationship element of a first activity in the checklist file of a first participating role of the participating roles includes a dependency relationship. A plurality of checklist instances is generated. Each checklist instance being stored in a second database. Each checklist instance corresponds to an associated checklist file and records a status of each activity and of each relationship element in the associated checklist.

16 Claims, 10 Drawing Sheets

```
<content>
<EventDefinition>
    <ID>EmployeeNewHire</ID>
    <Category>CareerEvent</Category>
    <Title>NewHirechecklist</Title>
    <Image>cssp/images/NewHire1.jpg/Image>
    <Description>
        USE THIS FORM TO KEEP TRACK OF ALL OF THE THINGS YOU NEED TO DO AS YOU START YOUR NEW JOB.
    </Description>
    <RequiredText>Requiredactivity</RequiredText>
    <AlertInterval>15,10,5</AlertInterval>  401
    <Activities>
        <Activity>
            <ID>19Doc</ID>
            <Category>Within1stweek</Category>                                    402
            <Title>Bring I-9 documentation, or complete the I-9 form with HR or Manager
            </Title>
            <TriggerActivity>false</TriggerActivity>
            <DependantActivity>false</DependantActivity>
                <Completed>false</Completed>
                <Required>true</Required>
                <Expired>false</Expired>                  403
            <Link>http://www.ibm.com</Link>
            <Model>false</Model>
            <Path></Path>
            <KBDocumentName>KBDOC/LearnMoreDefault.xml</KBDocumentName>
                <UserCredentialContainedInUrl>false</UserCredentialContainedInUrl>
            <PartnerServiceName></PartnerServiceName>
            <WebServiceCallback>false</WebServiceCallback>
            <SamlSso>false</SamlSso>.
        </Activity>
```

*FIG. 4*

```
CREATE TABLE EVENTS
(
        USER_ID                    VARCHAR(50)NOT NULL,
        EVENT_ID                   VARCHAR(50)NOT NULL,
        CREATE_DATE                DATE,
        START_DATE                 DATE,
        END_DATE                   DATE,
        LAST_UPDATE                DATE,
        NEXT_UPDATE                DATE,
           STATUS                  VARCHAR(30),
           CATEGORY                VARCHAR(100),
           TITLE                   VARCHAR(100),
           IMAGE                   VARCHAR(100),
           DESCRIPTION             VARCHAR(500),
           REQUIRED_TEXT           VARCHAR(100),
           ALERT_INTERVAL          VARCHAR(30),
           PRIMARYKEY              (USER_ID,EVENT_ID)
)
CREATE TABLE ACTIVITIES
(
        USER_ID                    VARCHAR(50)NOT NULL,
        EVENT_ID                   VARCHAR(50)NOT NULL,
        ACTIVITY_ID                VARCHAR(50)NOT NULL,
        SEQNUM                     VARCHAR(2),
        CATEGORY                   VARCHAR(100),
        TITLE                      VARCHAR(500),
        TRIGGER_ACTIVITY           VARCHAR(6),
        DEPENDENT_ACTIVITY         VARCHAR(6),
        COMPLETED                  VARCHAR(6),
        REQUIRED                   VARCHAR(6),
        PROCEED_LINK               VARCHAR(6),
        PROCEED_MODEL              VARCHAR(6),
        PATH_URL                   VARCHAR(150),
        KB_DOCUMENT_NAME           VARCHAR(150),
        CREDENTIAL_IN_URL          VARCHAR(6),
        PARTNER_SERVICE_NAME       VARCHAR(100),
        WEB_SERVICE_CALLBACK       VARCHAR(6),
           PRIMARYKEY              (USER_ID,EVENT_ID,ACTIVITY_ID),
              FOREIGNKEY           (USER_ID,EVENT_ID) REFERENCES EVENTS ON DELETE CASCADE
)
```

WORKFLOW METHOD, SYSTEM, AND DATA STRUCTURE

FIELD OF THE INVENTION

The present invention relates generally to the field of workflow, and more particularly to a workflow implementation method, system, and data structure for executing a workflow.

BACKGROUND OF THE INVENTION

With the rapid development of information technology (IT) and the need of enterprises for increasingly complex business process management, the concept, method and technology of workflow have found increasingly wide use.

A workflow refers to different activities of different roles for completing a common task, and a workflow can also be seen as the movement of documents and/or tasks in a work process. Traditional workflow implementations focus on the convenience of workflow execution. The design of the semantic structure can change the description, design and execution of the process. In a traditional workflow implementation, a whole complex process related to a task is described as a monolithic workflow across the entire enterprise and is difficult to be decomposed. The entire business process with the activities of all participating roles and interactions among them are described in this one complex, monolithic business process. The workflow thus described must be extremely complex, and even for a simple workflow example, it is difficult to use the business process execution language (BPEL®) etc. to describe it. Alternatively, a state machine can also be used to describe a workflow. However, a state machine is not a natural semantic mapping for random sequences of activities, since many unnecessary states would need to be defined to describe state transitions based on task completions.

In addition, since a business process of an enterprise is not fixed, but varies frequently, and at the same time, a variation of most business processes is not an entirely brand-new one, but a partial one, what is needed is to be able to update parts of the business process easily without affecting the entire business process. In a traditional workflow system, any change to the business process usually means redesign and redeployment of the entire workflow system. From the perspective of enterprise operation, any update to the business process, even a minute variation, should be informed to all the participants (roles), and all the participants need to traverse all the activities so as to know the occurred variation. This consumes much time and effort.

Furthermore, since usually a plurality of participating roles may be involved in a business process, and these participating roles may be in different positions and may use different communication means, different notification mechanisms may be needed to inform related events in the workflow execution to different participating roles. It is difficult for traditional workflow systems to implement informing different participants with different notification mechanisms, or even if it is implemented, it can be implemented only in a fixed manner, and is not configurable and changeable as required.

In addition, since a traditional workflow system is centered on the business process itself, it is difficult to describe the coordinating relationships among multiple roles involved in a complex business process.

Finally, in fact, end users are only interested in the status and execution of the subset of the business process pertaining to them, instead of the whole business process. Since traditional workflow systems focus on the execution of the entire business process, they have to expose the entire business process to all the users, while it is difficult for each user to understand his/her activities in the business process, thus bringing about inconvenience for the users.

Obviously, a new workflow implementation method and system capable of overcoming the above defects of the existing workflow system is needed in the art.

SUMMARY OF THE INVENTION

The present invention provides a method for implementing a workflow, said workflow dividing a general work task of an enterprise into activities and associated relationships with respect to a plurality of participating roles in the workflow, said method comprising:

generating a checklist file for each participating role, each checklist file stored in a first database, each checklist file specifying activities of each participating role and at least one relationship element for each activity of each participating role, wherein the at least one relationship element of a first activity in the checklist file of a first participating role of the plurality of participating roles comprises a dependency relationship; and generating a plurality of checklist instances, each checklist instance being stored in a second database, each checklist instance corresponding to an associated checklist file and recording a status of each activity and of each relationship element in the associated checklist.

The present invention provides a computer system comprising a processor and a computer readable memory unit coupled to the processor, said memory unit containing software that when executed by the processor perform a method for implementing a workflow, said workflow dividing a general work task of an enterprise into activities and associated relationships with respect to a plurality of participating roles in the workflow, said method comprising:

generating a checklist file for each participating role, each checklist file stored in a first database, each checklist file specifying activities of each participating role and at least one relationship element for each activity of each participating role, wherein the at least one relationship element of a first activity in the checklist file of a first participating role of the plurality of participating roles comprises a dependency relationship; and generating a plurality of checklist instances, each checklist instance being stored in a second database, each checklist instance corresponding to an associated checklist file and recording a status of each activity and of each relationship element in the associated checklist.

The present invention provides a computer program product, comprising a computer usable storage medium having computer
software that when executed by a computer system causes the computer system to perform a method for implementing a workflow, said workflow dividing a general work task of an enterprise into activities and associated relationships with respect to a plurality of participating roles in the workflow, said method comprising:

generating a checklist file for each participating role, each checklist file stored in a first database, each checklist file specifying activities of each participating role and at least one relationship element for each activity of each participating role, wherein the at least one relationship element of a first activity in the checklist file of a first participating role of the plurality of participating roles comprises a dependency relationship; and generating a plurality of checklist instances, each checklist instance being stored in a second database, each checklist instance corresponding to an associated checklist file and recording a status of each activity and of each relationship element in the associated checklist.

The present invention provides a workflow data structure for managing a plurality of participating roles and a status of each participating role in a workflow, said workflow dividing a general work task of an enterprise into activities and associated relationships with respect to the participating roles, said workflow data structure comprising:

a checklist file for each participating role, each checklist file stored in a first database, each checklist file specifying activities of each participating role and at least one relationship element for each activity of each participating role, wherein the at least one relationship element of a first activity in the checklist file of a first participating role of the plurality of participating roles comprises a dependency relationship; and a plurality of checklist instances, each checklist instance being stored in a second database, each checklist instance corresponding to an associated checklist file and recording a status of each activity and of each relationship element in the associated checklist.

BRIEF DESCRIPTION OF THE DRAWINGS

Novel features believed to be characteristic of the present invention are described in the attached claims. The present invention itself and its preferred mode of use, additional objects, features and advantages will be best understood with reference to the detailed descriptions of illustrative embodiments below when read in conjunction with the drawings.

FIG. 4 shows a checklist example, according to an embodiment of the present invention expressed in the Extensible Markup Language (XML).

FIG. 5 shows a database structure example for storing a checklist instance and the status of the activities therein, according to an embodiment of the present invention.

FIG. 7 shows a state of a UI of an exemplary workflow implemented by a portlet, according to an embodiment of the present invention in which a checklist is displayed.

DETAILED DESCRIPTION OF THE INVENTION

Figure 1:
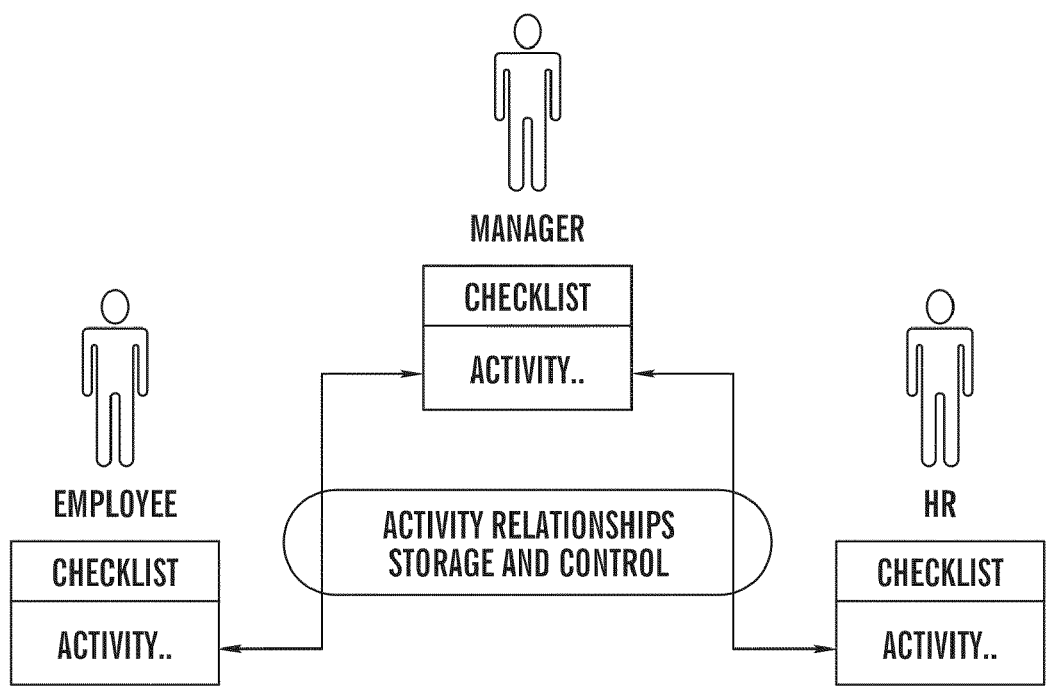
FIG. 1 shows a schematic diagram of a workflow implementation according to the present invention.

Embodiments of present invention will be described below with reference to the drawings. However, it should be understood that the present invention is not limited to the described specific embodiments. Instead, it is contemplated to implement and practice the present invention by using any combination of the following features and elements, regardless of whether they are related to different embodiments. So, the following aspects, features, embodiments and advantages are only illustrative, and should not be regarded as elements or definitions of the attached claims, unless otherwise stated explicitly in the claims. The references to features, advantages or similar languages in the specification do not imply that all or some of the features and advantages that can be implemented using the present invention are in any single embodiment of the present invention. Instead, the language involving the features and advantages are understood as only meaning that specific features, advantages and characteristics described in relation to the embodiments are contained in at least one embodiment of the present invention.

A workflow refers to different activities of different participating roles for completing a common task, and a workflow can also be seen as the movement of documents and/or tasks in a work process. A participating role of a workflow is a participant in the workflow.

A workflow involves how to divide a general work task into different activities, who will complete these activities, what is the relative order of these activities, how to synchronize these activities, how information flows among various involved departments and persons to support the completion of the activities, and how to track these activities, etc. so as to increase the efficiency of completing the work task.

A workflow system refers to the modeling, deployment, execution, monitoring and coordination of business processes in a distributed office environment of an enterprise performed with the aid of a computer system. A workflow comprises a workflow modeling component and a workflow execution component. The workflow modeling component functions in a design environment, which enables an administrator or an analyst to define business processes and activities, analyze and simulate them, and assign them to persons. The workflow execution component is a runtime system which comprises the execution user interface (UI) seen and operated by end users, and a workflow engine for helping or performing the coordination of business processes and activities. The workflow system usually comprises both automatic processes based on software and manual processes completed by persons.

In one aspect of the present invention, there is provided a workflow implementation method comprising the steps of: defining a workflow as a plurality of checklists according to enterprise policies and/or business rules, the plurality of checklists being related to participating roles of the workflow and including activities related to the participating roles in the workflow; and deploying the checklist to a runtime environment so as to execute the workflow.

In another aspect of the present invention, there is provided a system for executing a workflow, wherein the workflow is defined by a plurality of checklists written and deployed according to enterprise policies and/or business rules, the plurality of checklists being related to participating roles of the workflow and including activities related to the participating roles in the workflow and the relationships between activities, the system comprising: a checklist presentation controller for providing to a participant of the workflow a checklist user interface (UI) for the participant during the execution of the workflow, and for receiving workflow operations by the participant from the checklist UI; and a workflow engine for storing a checklist instance for the participant during the workflow execution, and according to a workflow operation of the participant received from the checklist presentation controller, updating a status of an activity in the stored workflow instance, and according to the relationships between the activity and activities in other checklists, coordinating the execution of the activities in the other checklists.

In a further aspect of the present invention, there is provided a method for executing a workflow, wherein the workflow is defined by a plurality of checklists written and deployed according to enterprise policies and/or business rules, the plurality of checklists being related to participating roles of the workflow and including activities related to the participating roles in the workflow and the relationships between activities, the method comprising the steps of providing to a participant of the workflow a checklist UI for the participant; storing a checklist instance for the participant; receiving a workflow operation of the participant from the checklist UI; and according to the received workflow operation of the participant, updating a status of an activity in the stored workflow instance, and according to the relationships between the activity and activities in other checklists, coordinating the execution of the activities in the other checklists.

The workflow implementing method, workflow execution method and system using a checklist according to the present invention have the following advantages:

Firstly, by using a checklist, a user is provided a view of the business process related to him/her. The participant only needs to know the portion of the workflow related to him/her, and only needs to focus on the to-do activities listed in the checklist, without need to know the entire complex workflow; when the business process of the enterprise varies, it is only needed to inform the participants involved of the variation, without need to inform all the participants of the variation of the business process, thus decreasing the workload of the participants of the workflow and increasing their work efficiency.

Secondly, the checklists are configurable and extensible, thus facilitating the business process variation of the enterprise. When a business process of the enterprise changes, it only needs to write or revise and deploy again the checklist, preferentially an Extensible Markup Language (XML) document, without need to re-write the workflow application, thus greatly facilitating the variation and maintenance of the business process.

Thirdly, the workflow implementation method, the workflow execution method and system according to the present invention allow a user to better understand his/her role and activities in the workflow, and are useful for coordination among different users.

Thus, the workflow implementation method and system according to the present invention will increase the efficiency of the execution and variation of a business process, thus saving the costs of the enterprise.

The present invention provides a workflow implementation method using checklists for participating roles, centered on participants and facilitating the coordination between the participants. Thus a workflow can be described by a set of checklists for different participating roles.

Hereinafter, the basic concept of the present invention will first be described by way of example.

FIG. 1 shows a schematic diagram of an example of a workflow implementation using a checklist according to an embodiment of the present invention. The workflow example is about a staff recruitment business process of an enterprise. As shown in the figure, according to an embodiment of the present invention, the workflow is implemented as a set of checklists for Manager, Human Resources (HR) and Employee, respectively. Thus, Manager, HR and Employee together complete the business process of staff recruitment represented by the workflow by executing related activities in the respective checklists in coordination with each other. The coordination among the participants is realized by establishing relationships between the related activities in the respective checklists, storing the relationships, and controlling the execution of the workflow based on the relationships. Of course, it should be noted that FIG. 1 is only an illustrative example for explaining the workflow implementation method of the present invention, and not a limitation to the present invention. For example, there may be other participants in an actual workflow implementation about an enterprise's staff recruitment.

Figure 2:
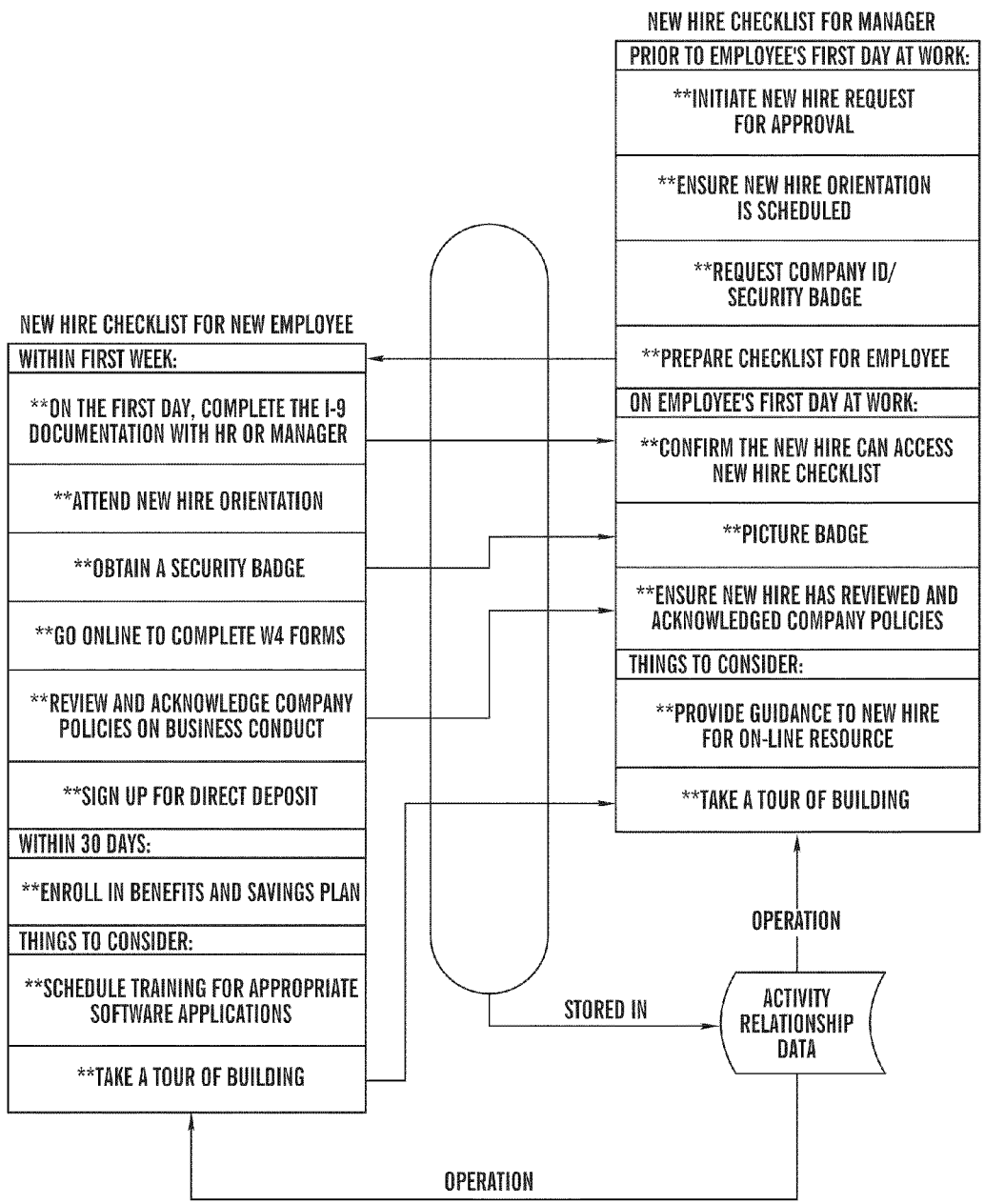
FIG. 2 shows an example of implementing a workflow as checklists for participating roles by using the workflow implementation method, according to an embodiment of the present invention.

FIG. 2 specifically shows a workflow implementation using checklists according to an embodiment of the present invention. As shown in FIG. 2, firstly, Manager initiates a "New Hire" event, and thus obtains a checklist. Then according to the checklist, Manager completes and checks one by one the activities prior to the onboard date in the checklist. These activities include initiating a New Hire request for approval, ensuring New Hire Orientation is scheduled, requesting a company Identifier (ID)/security badge, and preparing a checklist for the employee. Then Manager begins to complete and check various activities needing to be completed on Employee's first day at work. The first is to confirm the New Hire can access a New Hire checklist that has been prepared. The completion of this activity depends on a corresponding activity of New Hire; i.e. New Hire acknowledges he/she can access the checklist that has been prepared, or New Hire has accessed the checklist that has been prepared.

That is, after the workflow system according to the present invention has presented to New Hire the checklist prepared for him/her by Manager through a UI for New Hire, the system for executing a workflow implemented according to the present invention will automatically sends a notification to Manager through a UI for Manager, thus allowing Manager to complete and check the activity of confirming that New Hire can access the New Hire checklist, or in one embodiment, the workflow system implemented according to the present invention can set directly as completed the status of the activity of confirming that New Hire can access the New Hire checklist in the Manager checklist. Whatever the case, Manager can continue to complete and check the subsequent activities in his/her checklist, and at the same time, New Hire can also complete and check the subsequent activities in his/her checklist.

New Hire can complete and check the activities in his/her checklist one by one according to his/her checklist, including the following: on the first day on-board, complete the I-9 documentation with HR or Manager; within the first on-board week, attend New Hire Orientation, obtain a security badge, go online to complete W4 forms, review and acknowledge company policies on business conduct, sign up for Direct Deposit (electric salary settlement) program, and within a month enroll in the benefits and savings plan. At the same time, Manager needs to complete and check the following further activities on Employee's first day at work: picture badge; ensure New Hire has reviewed and acknowledged company policies. Herein, the completion of the picture badge activity depends on the completion and checking of the activity of New Hire's obtaining the security badge. In one embodiment, the workflow system implemented according to the present invention sets to "completed" status the picture badge activity in Manager's checklist according to the checking of the activity of obtaining the security badge in the New Hire's checklist. At the same time, the completion of the activity of ensuring New Hire has reviewed and acknowledged company policies in Manager's checklist depends on the completion and checking of the activity of reviewing and acknowledging company policies on business conduct in the New Hire's checklist, and preferably, after the activity in the New Hire's checklist is checked, the workflow system implemented according to the present invention sets automatically the activity in the Manager's checklist to "completed" status.

In the New Hire's checklist, there are some optional items which are not necessarily to be completed, including scheduling training on appropriate software applications and talking a tour of the office building. At the same time, in the Manager's checklist there are also some optional items which are not necessarily to be completed, including providing guidance to New Hire on on-line resources and talking a tour of the office building. The completion of the activity of taking a tour of the office building in the Manager's checklist is set to "completed" status by the system after the completion of the activity of talking a tour of the office building in the New Hire's checklist.

The dependency relationships between the various activities of Manager and New Hire described above are stored in an activity relationship database as shown. The workflow system implemented according to the present invention learns the dependency relationships between the various activities of Manager and New Hire by querying the activity relationship database, and performs corresponding operations on the activities in the checklists of Manager and New Hire. For example, when a certain participating role wants to set an activity in a checklist to "completed" status by checking it, the workflow system learns, by querying the activities relationship database, that this activity depends on another activity of another participating role and the other activity of the other participating role has not been completed, then the workflow system can suspend setting this activity to "completed" status, and stop the further execution of the checklist of this certain participating role to wait for the completion of the other activity of the other participating role. After the other activity of the other participating role is completed, the workflow system can automatically set the status of the activity of the certain participating role as completed. The activity relationship data can be stored in a separate database, and can also be stored in a file defining the checklist; i.e. as attributes of the activities defined in the file defining the checklist. In addition, the statuses of the various activities in the checklist can also be stored in a separate database to be queried by the workflow system.

Figure 3:
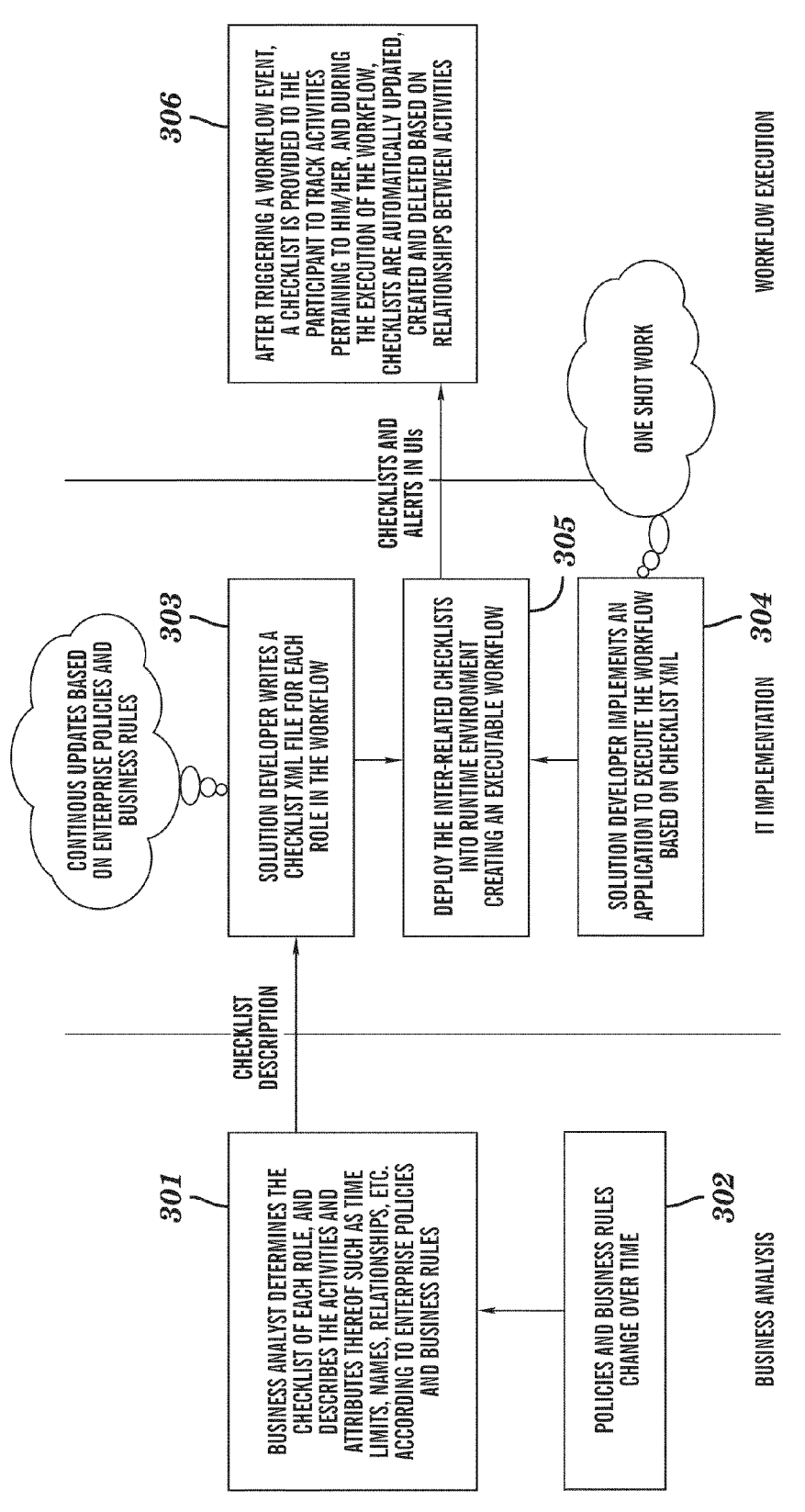
FIG. 3 shows a schematic process of the method for implementing a workflow, according to an embodiment of the present invention.

An exemplary process of a method for implementing a workflow according to an embodiment of the present invention will be described hereinafter with reference to FIG. 3. As shown in the figure, the process of the method for implementing a workflow according to the embodiment of the present invention is divided into three stages: a business analysis stage, an Information Technology (IT) implementation stage and a workflow execution stage.

Firstly, at the business analysis stage, at step 301, a business analyst determines a checklist for each participating role of a workflow through an analysis of a business process of an enterprise, and describes, according to enterprise policies and business rules, various activities in each checklist and their attributes such as names, categories to which they belong, time limits, necessary or not, and relationships with other activities, etc., so as to form a textual description of the checklist for each participant, and provide it to the next stage; i.e., the IT implementation stage.

When the enterprise policies and business rules change over time (step 302), the business analyst will describe each checklist and its activities according to the changed enterprise policies and business rules, so as to form a new textual description of the checklist and provide it to the IT implementation stage.

Thus entering the IT implementation stage, and at step 303, an IT developer writes a checklist file for each participating role that can be deployed and used in a workflow execution system according to the textual description of the checklist from the business analysis stage. In an embodiment of the present invention, the checklist file is an XML file. Of course, the checklist can also be implemented using a file of any other textual or non-textual format that can be used for describing the activities and their attributes in the checklist. Only as an example, the IT developer can use IBM Rational Application Developer (RAD) to generate a checklist XML file.

In the checklist file, the names and time limits of various activities to be completed by the workflow participant using the checklist as well as interrelations of the activities with activities in the checklists for other participants can be described. In an embodiment of the present invention, the interrelations between activities in a checklist and activities in other checklists are described as the attributes of the activities in the XML file of the checklist. In other embodiments of the present invention, interrelations between activities in different checklists can also be described in a separate file or a database.

All kinds of interrelationships between activities in the checklist and activities in other checklists can be described in the checklist file.

For example, a synchronous relationship among activities can be described in the checklist file. In such a synchronous relationship, the completion of an activity in one checklist means the simultaneous completion of an activity in another or other plurality of checklists. For example, in an employee leave workflow, an activity of PM is to confirm the employee has returned the badge, and an activity of the security department is to confirm the badge has been received. Thus the completion of the activity of the security department means at the same time the completion of the activity of PM. Thus in an embodiment using a checklist file of XML format of the present invention, a <SyncActivity> element, for example, can be used to represent this relationship, wherein the <SyncActivity> element acts as an attribute of the element of the activity in the checklist for PM, while the content of the <SyncActivity> element is the ID of the activity of the security department. Thus, when the checklists are deployed, the workflow execution system according to the present invention can process correspondingly according to such a synchronous relationship as described in the checklists so as to coordinate the executions of the activity of PM and the activity of the security department.

A dependency relationship among activities can also be described in a checklist file. In such a dependency relationship, the completion of an activity in a checklist will lead to the execution of an activity in another checklist; i.e. cause the system automatically sends a notification for executing the activity to a participant using the other checklist. Such a dependency relationship can be one to many, i.e. the completion of an activity in a checklist will lead to the execution of activities in other plurality of checklists. Such a dependency relationship can also be many to one; i.e. the completion of activities in a plurality of checklists will lead to the execution of an activity in another checklist. Of course, such a dependency relationship can also be many to many; i.e. the completion of activities in a plurality of checklists will lead to the executions of activities of a plurality of other checklists.

In addition, such a dependency relationship can also be delay processed; i.e., after the completion of an activity in a checklist, then after a specified period of time elapses, a notification for executing a related activity is sent to a user of another checklist.

For delay processing in a one to many relationship with respect to completion of a first activity in the checklist file of a first participating role, a dependency relationship in the checklist file of the first participating role specifies an activity in the checklist file of each participating role of at least two other participating roles such that completion of the first activity triggers notification, after elapse of a specified time delay, of the at least two other participating roles that the activity in the checklist file of each participating role of the at least two other participating roles is to be executed as a consequence of the first activity having been completed.

For delay processing in a many to one relationship with respect to completion of a first activity in the checklist file of a first participating role, a dependency relationship in the checklist file of the first participating role specifies an activity in the checklist file of each participating role of at least one other participating role and a second activity in the checklist file of a second participating role such that completion of the first activity and the activity in the checklist file of each participating role of the at least one other participating role triggers notification, after elapse of a specified time delay, of the second participating role that the second activity in the checklist file of the second participating role is to be executed as a consequence of the first activity and the activity in the checklist file of each participating role of the at least one other participating role having been completed.

For delay processing in a many to many relationship with respect to completion of a first activity in the checklist file of a first participating role, a dependency relationship in the checklist file of the first participating role specifies an activity in the checklist file of each participating role of at least one other participating role and an activity in the checklist file of at least two other participating roles such that completion of the first activity and the activity in the checklist file of each participating role of the at least one other participating role triggers notification, after elapse of a specified time delay, of the at least two other participating roles that the activity in the checklist file of each participating role of the at least two other participating roles is to be executed as a consequence of the first activity and the activity in the checklist file of each participating role of the at least one other participating role having been completed In an embodiment using a checklist file of XML format of the present invention, the above dependency relationships can all be represented by appropriate XML elements and their attributes. For example, if activity 2 of participating role B needs to be executed after the completion of activity 1 of participating role A, then an attribute represented by a <TriggerActivity> element can be added into the element representing activity 2 in the checklist for participating role B, and the content of the <TriggerActivity> element is set as the ID of activity 1 of participating role A. Thus, after the checklists are deployed, the workflow execution system according to the present invention can process correspondingly according to the dependency relationship as described in the checklist so as to coordinate the executions of the activity of PM and the activity of the security department.

Of course, the above described relationships between activities are only examples, and not a limitation to the present invention. For example, in an embodiment using the checklist file of XML format of the present invention, new relationships between activities can be described easily by extending the elements of XML. In addition, in a checklist file of the present invention, a relationship of an activity with a status of another checklist can also be described; for example, the execution of an activity in a checklist file for a participating role will lead to the creation or deletion of a checklist file for another participating role, etc.

The checklist files are completely configurable, and the activities and attributes in a checklist file as well as the relationships between various activities can be added, deleted or modified conveniently according to the changes of enterprise policies and/or business rules.

FIG. 4 shows a checklist example according to an embodiment of the present invention expressed in the XML language. FIG. 4 shows a checklist XML file titled "New Hire Checklist", and an activity titled "Bring I-9 documentation, or complete the I-9 form with HR or manager" is described in the checklist XML file. Herein, A <TriggerActivity> element at reference number 401 describes which activity will trigger the execution of this activity, and the ID of the other activity which will trigger this activity can be placed into the text part of the element. A <DependentActivity> element at reference number 402 describes the completion of the activity depends on the completion of which activity. A <Link> element at reference number 403 describes a link for completing the activity, which can be linked to another portlet or external website, so that the user can complete the activity by accessing the portlet or external website. The XML file is completely configurable, and more relationships can be added as elements into the XML file as required.

At step 304, an IT developer develops an application for executing a workflow based on checklist XML. The developer can use any appropriate developing tool and editing language to develop an application for executing a workflow based on checklists. The application will be deployed into an enterprise computer network environment so as to form a system for executing a workflow according to the present invention. The application comprises at least the following functions: when a user issues an event for initiating a workflow, the checklist file for the user is loaded, and a checklist UI is generated and provided to the user, and a checklist instance including the statuses of the activities therein is stored in a persistent storage. When the user completes and checks activities in the checklist in the checklist UI, the activities' statuses are stored and updated in the database; and relationships between activities are read and resolved from a checklist file or the database. Based on the relationships between the activities, according to the operation of the user on an activity in a checklist, the status of an activity in another checklist is automatically changed, or a notification for executing an activity in the checklist for another participating role is sent to the other participating role, or a checklist for another user is automatically generated. The checklist instances including the statuses of all the activities therein can be stored in a database table, so as to read and update the statuses. Any database software like DB2®, Oracle®, SQL server etc. could be used to store the statuses of activities.

In an embodiment of the present invention, the IT developer uses IBM RAD and IBM WebSphere® Portlet Factory to develop an application for executing a workflow. The application for executing a workflow will be deployed on a IBM WebSphere® portal server, and the checklist UIs for various participating roles of the workflow are provided to the various participating roles as portlets. At the same time, the Portlet Wiring feature provided by the IBM WebSphere® portal server is used to implement the communications and interactions among the checklist portlets. In addition, IBM DB2® is used to store activity statuses. FIG. 5 shows a exemplary database structure for storing a checklist instance and the statuses of activities therein according to an embodiment of the present invention.

As known by a person skilled in the art, the checklists for various participating roles in a workflow, including the activities that should be completed by the various roles and the relationships between the activities, completely define the workflow. So, a person skilled in the art can easily develop an application for executing the workflow by using general editing knowledge in the art.

In one embodiment, the development work at this step is a one-shot work; i.e., for a given workflow, the development work is done only once. When enterprise policies and/or business rules change during the execution of the workflow, it is only needed to change or rewrite a checklist XML file and redeploy it so as to realize the change of the workflow, without redeveloping the application for executing the workflow. In addition, it is also contemplated that the application for executing a workflow according to the present invention is applicable to a plurality of workflows in one or more categories or even to all workflows of an enterprise. Thus, after deploying the application for executing a workflow according to the present invention into a computer network environment so as to form a system for executing a workflow according to the present invention, it is only needed to deploy different sets of checklist files for different workflows so as to execute different workflows.

At step 305, the application for executing a workflow generated at step 304 is deployed into an enterprise computer network, and the interrelated checklists as generated at step 303 are deployed to a runtime environment so as to establish a system for executing the workflow. In one embodiment, the application for executing a workflow and the interrelated checklists are both deployed onto a server in the enterprise computer network, and in one embodiment of the present invention, the sever is an IBM WebSphere® portal server.

Then the process proceeds to the workflow execution stage. At step 306, after a participating role of the workflow issues an event for initiating a workflow, the workflow execution system loads a deployed checklist for the participant, and provides the checklist for the participant to him/her through a UI, so as to enable him/her to track and execute activities related to him/her. During the workflow execution, the system for executing a workflow according to the present invention will automatically update, create or delete checklists, or send notifications for executing their activities to involved participating roles, according to the operations of the participating roles and the relationships between the activities in the checklists.

Figure 6:
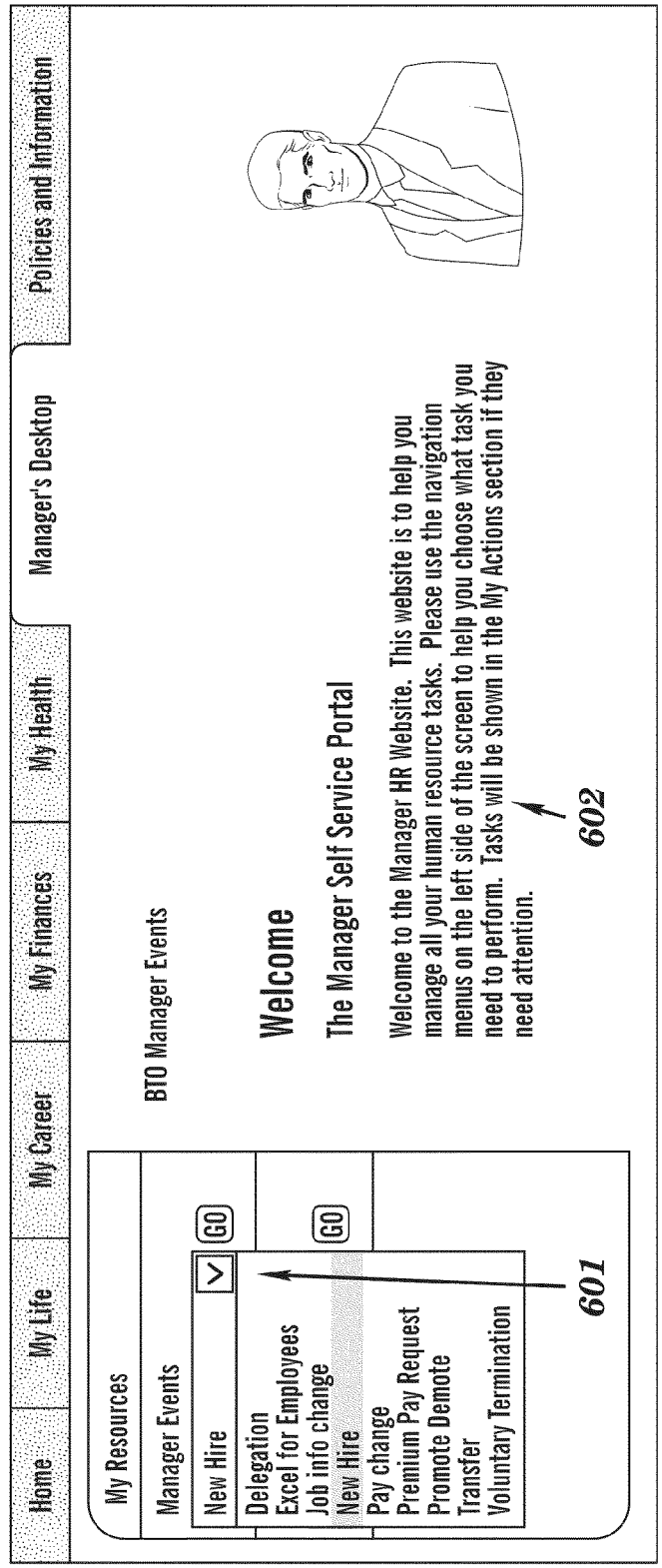
FIG. 6 shows an initial state of a user interface (UI) of a exemplary workflow implemented by a portlet, according to an embodiment of the present invention.

For example, in an embodiment of the present invention that uses Portlet Wiring to implement the interactions between checklists, if a user select a workflow in a dropdown list in a workflow selection portlet and clicks "go", the portlet wiring feature in IBM WebSphere® portal server sends this event to the checklist portlet which will show the checklist of the workflow for the user based on the wiring configurations of the event. During the execution of the workflow, as a user is completing and checking activities, his/her checklist portlet will query the statuses of activities in the checklist stored in a database table, present a real-time checklist to the user, and automatically update the statuses of the activities in other related checklists or send to other participating roles the notification for executing related activities. FIG. 6 shows an initial state of a UI of an exemplary workflow implemented by a portlet according to an embodiment of the present invention. Herein the reference number 601 shows a workflow selection portlet for Manager, and reference number 602 shows where the checklist portlet of Manager will be displayed. When a user selects "New Hire" and clicks "go", the wiring feature of the portal server will send the event name from the Manager event portlet to the checklist portlet, thus displaying the checklist of Manager for New Hire workflow.

Figure 7:
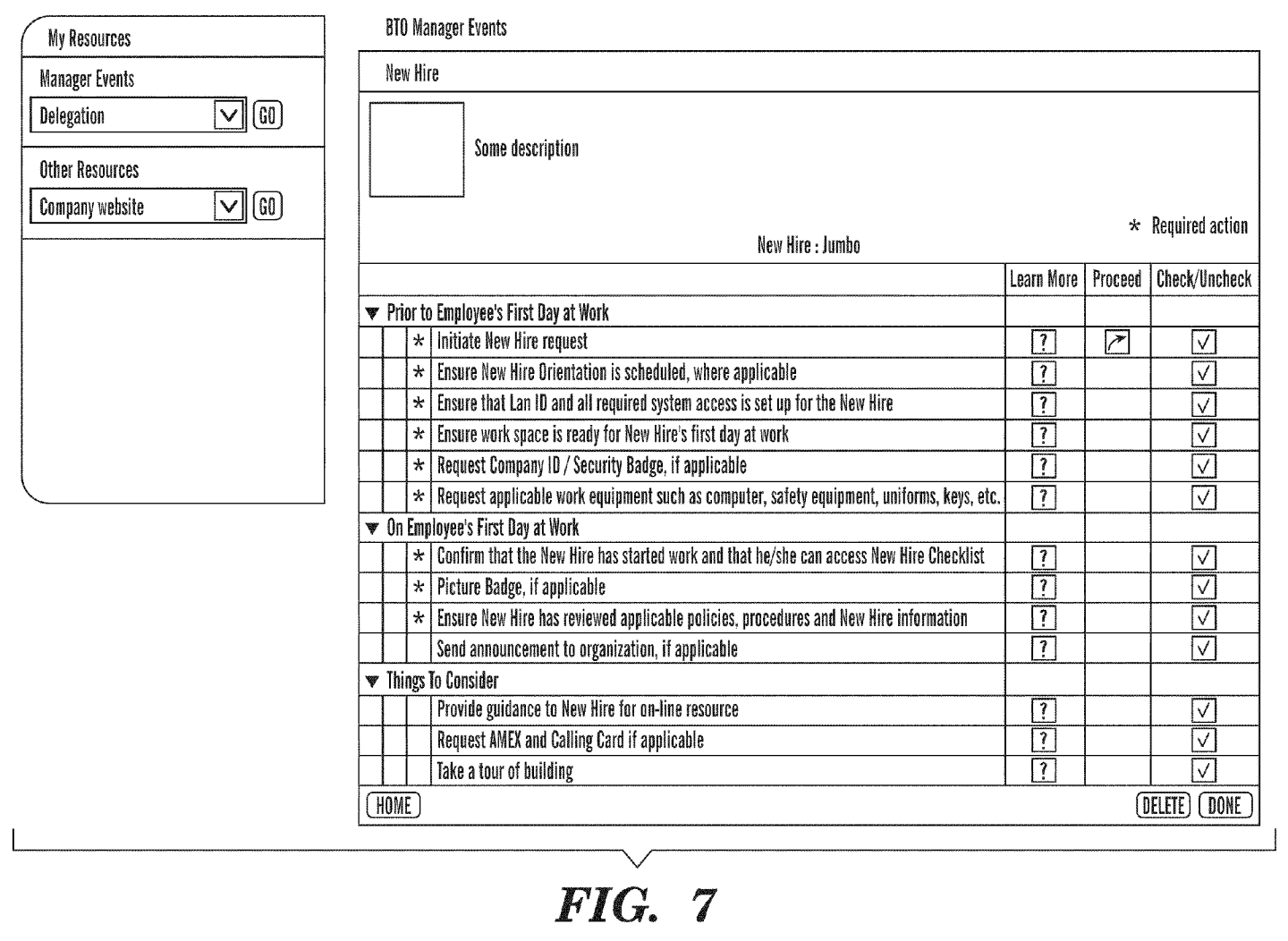

FIG. 7 shows a state of a UI of the exemplary workflow implemented by a portlet according to an embodiment of the present invention where a checklist is displayed. Herein the checklist UI is generated according to a checklist XML file, and the status of the checklist is stored in a database.

Figure 8:
FIG. 8 shows the UI of an exemplary workflow implemented by a portlet, according to an embodiment of the present invention, which has a plurality of checklists belonging to a plurality of workflows therein.

In the checklist, when a user checks an activity and set it to completed status, the system for executing a workflow according to the present invention will determine whether to automatically complete activities in other checklists and inform other participants to execute activities in the other checklists, etc. by querying the relationships between activities in the checklist instances in the database. If it is yes (i.e., automatically complete activities in other checklists and inform other participants), the system for executing a workflow according to the present invention will automatically update the statuses of other activities or inform other participants to execute their activities, etc. FIG. 8 shows the UI of an exemplary workflow implemented by a portlet according to an embodiment of the present invention, which has a plurality of checklists belonging to a plurality of workflows. A user selects to display a corresponding checklist by selecting a corresponding alert in an alert portlet. In such a case, when a user in a workflow checks an activity in his/her checklist, if the execution of an activity in the checklist for another participating user should be triggered, then an alert is generated for the other user, and the alert is sent to the UI for the other user. Thus when the other user clicks the alert in his/her alert portlet, the system can show the corresponding checklist for him/her so that he/she can execute his/her activities. There may be a plurality of alerts belonging to a plurality of workflows in the alert portlet for the user, thus the user can show a corresponding workflow by clicking any alert, so as to execute activities in the workflow.

Figure 9:
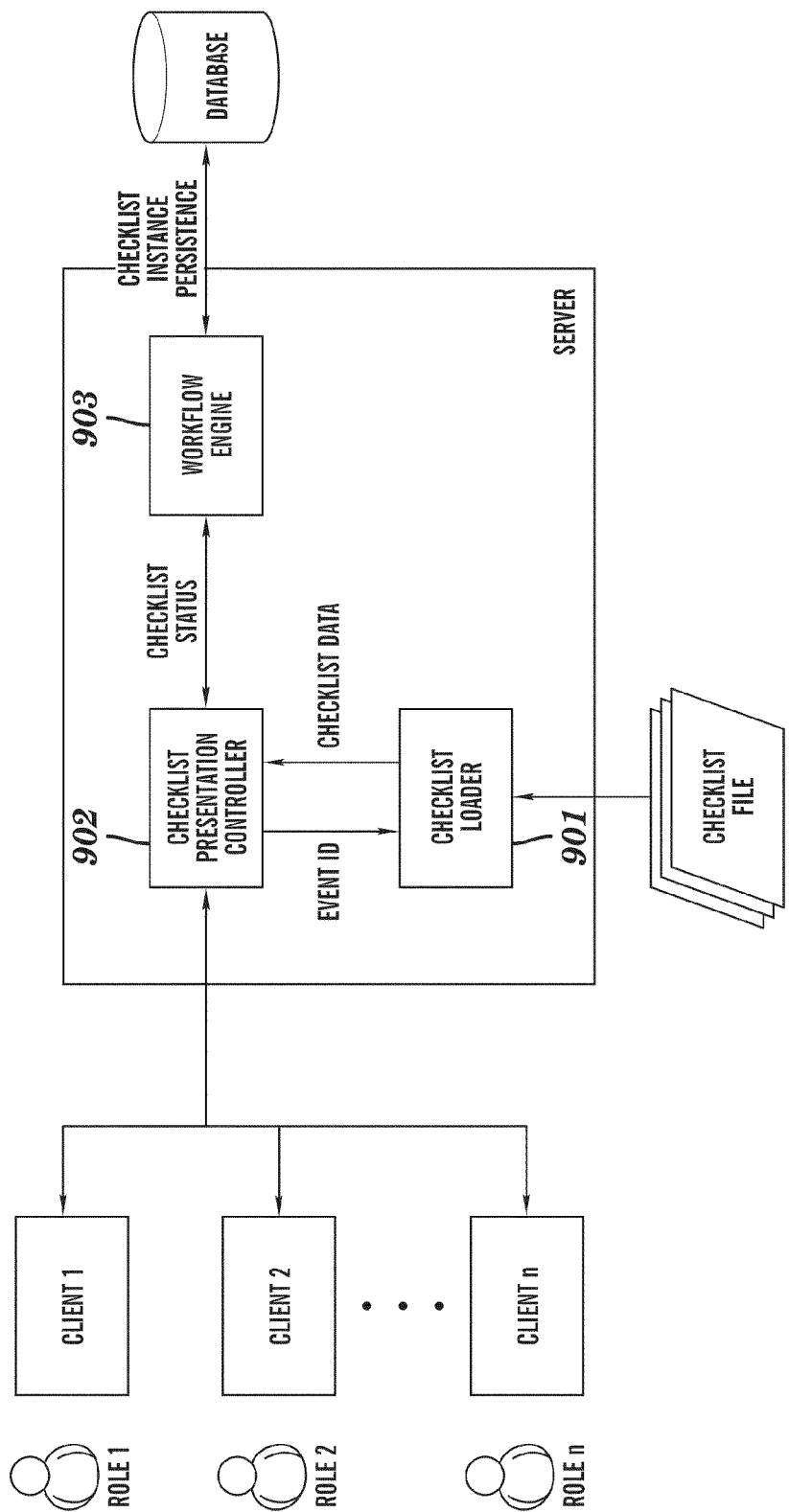
FIG. 9 shows a system for executing a workflow, according to an embodiment of the present invention.

The process of the method for implementing a workflow according to an embodiment of the present invention having been described above, it should be noted that the described steps and various details and features are only examples, and not a limitation to the present invention. Hereinafter, a system for executing a workflow according to an embodiment of the present invention will be described with reference to FIG. 9, wherein the workflow is defined by checklists for the participating roles of the workflow including the activities to be done by the roles and the relationships between the activities. As shown in FIG. 9, the system for executing a workflow according to an embodiment of the present invention comprises a checklist loader 901, a checklist presentation controller 902, and a workflow engine 903.

Herein, the checklist loader 901 is used for reading and loading a checklist from a corresponding checklist file after receiving a command for loading a checklist for a specific role from the checklist presentation controller 902, wherein the checklist is a checklist for each participating role of the workflow, as generated by the above method for implementing a workflow according to the present invention and completely defining the workflow.

The checklist presentation controller 902 is used for, when receiving a request for executing a workflow from a user, determining whether there is a checklist instance for the participant in a persistent storage. If the determination is yes (i.e., there is a checklist instance for the participant in a persistent storage), the workflow engine 903 obtains the status of the checklist from the persistent storage, and shows the checklist having the status as a UI to the user. If the determination is no (i.e., there is no checklist instance for the participant in a persistent storage), it loads the checklist for the user from a corresponding checklist file, forms a checklist instance for the user, sends the checklist instance including the statuses and relationships of the activities therein to the workflow engine 903 so as to be stored in the persistent storage, and shows the checklist instance as a UI element to the user. The checklist presentation controller 902 is also used for, when the user checks/un-checks an activity in the presented checklist during the execution of the workflow, sending the operations of the user to the workflow engine 903 so as to update the status of the activity in the checklist in the database and the statuses of other related checklist/activities, or sending to other users notifications for executing activities.

The workflow engine 903 is used for, when the checklist presentation controller 902 receives a checklist from the checklist loader 901, storing in the database the checklist instance from the checklist presentation controller 902, including the statuses and relationship of the activities therein, and for, when receiving operations on the activities in a checklist from the user through the checklist presentation controller 902, automatically setting the statuses of other activities and/or the statuses of other checklists in the database, or sending to other participants notifications for executing activities in other checklists. The workflow engine 903 is also used for, when the checklist presentation controller 902 is to present a checklist to the user, obtaining from the database a checklist instance including the statuses of the activities therein according to a command from the checklist presentation controller 902, and sending it to the checklist presentation controller 902.

In one embodiment, the system for executing a workflow according to the present invention is deployed in a network environment within an enterprise, and is deployed on a server. Each participant of the workflow communicate with the server through his/her client to perform workflow operations. In an embodiment of the present invention, the server is a portal server, such as IBM WebSphere® portal server, and the checklist presentation controller 902 is a portlet providing means on the portal server, for providing the checklist for each user to the client browser of the user in the form of a portlet.

The above description of the system for executing a workflow according to an embodiment of the present invention is only an example, and not a limitation to the present invention. The system for executing a workflow according to the present invention can have more, less or different modules, some modules can be merged together or divided into smaller modules, and the connection relationships between the modules may change. For example, the functions of the checklist loader 901 may also be incorporated into the checklist presentation controller 902.

Hereinafter, a method for executing a workflow according to an embodiment of the present invention will be described with reference to FIG. 10, wherein the workflow is defined by checklists for participating roles of the workflow including the activities to be executed by the roles and the relationships between the activities. In one embodiment, the method is executed by a system for executing a workflow according to the present invention as shown in FIG. 9.

Figure 10:
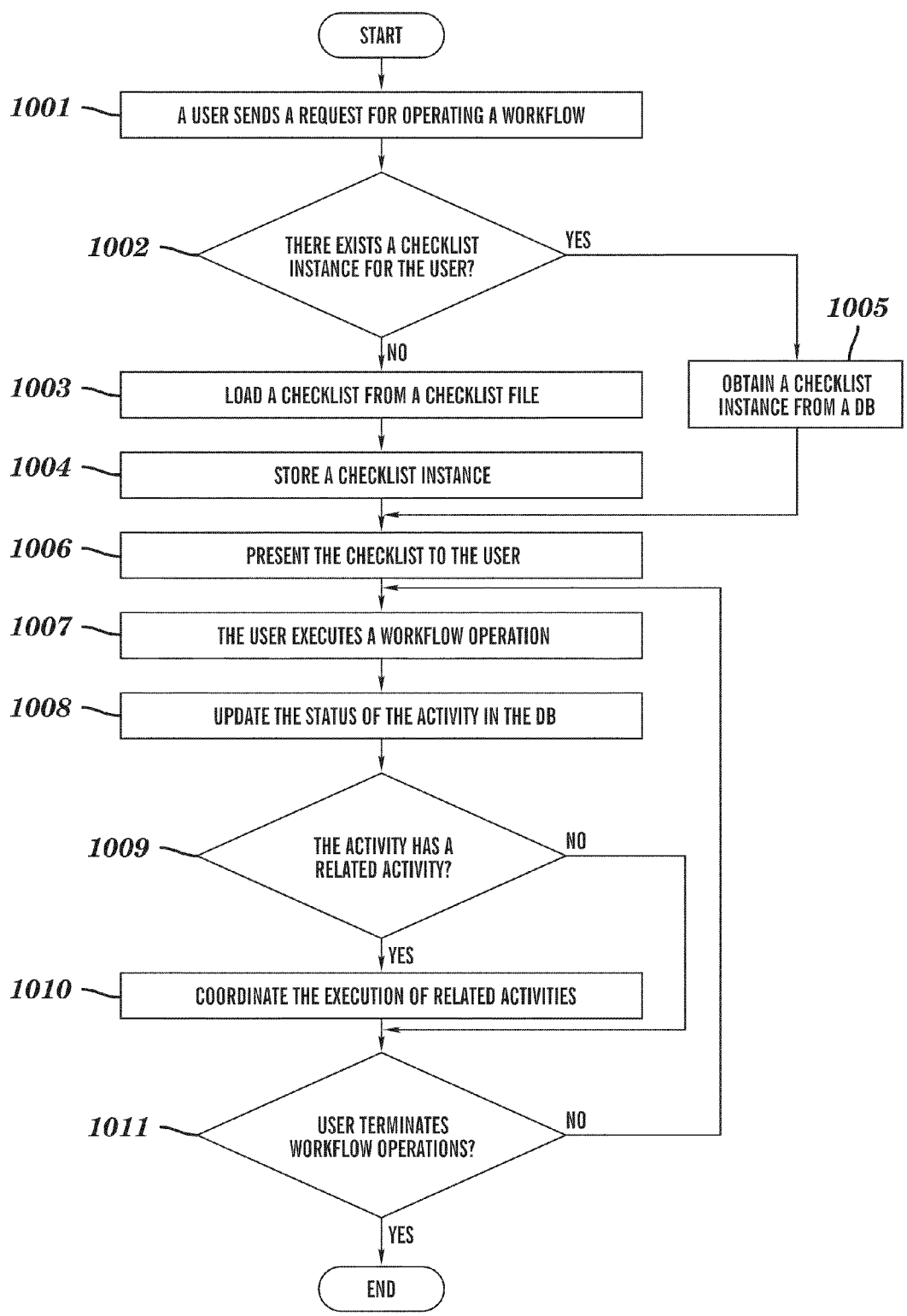
FIG. 10 shows a method for executing a workflow, according to an embodiment of the present invention.

As shown in FIG. 10, after the process begins, at step 1001, a user sends a request for executing a workflow. In one embodiment, the user sends the request for executing the workflow to a server through his/her client browser. The server is, in one embodiment, a portal server on which is deployed a workflow engine 903, and provides a checklist to the user through a portlet for the user to perform workflow operations. The user can be either a user initiating the workflow, or any other participant in the workflow.

Then, at step 1002, it is determined whether there is a checklist instance for the participant in a persistent storage. In one embodiment, he determination step is performed by a control module on the server such as the checklist presentation controller 902. If the determination result is yes (i.e., there is a checklist instance for the participant in a persistent storage), then the process proceeds to step 1003; otherwise the process proceeds to step 1005.

At step 1003, the checklist instance including attributes such as the statuses of the activities and relationships therein etc. is stored. In one embodiment, after the checklist presentation controller 902 receives a loaded checklist from the checklist loader 901, the checklist presentation controller 902 may store the checklist instance including attributes such as the statuses and relationships of the activities therein etc. in a persistent storage such as a database etc. through the workflow engine 903.

At step 1004, a checklist is loaded from a checklist file, thus obtaining a checklist instance. In one embodiment, this step is performed by the checklist loader 901 under the instruction of the checklist presentation controller 902.

At step 1005, the checklist instance including attributes such as the statuses and relationships of the activities therein, etc. is retrieved from persistent storage (e.g., a database). In one embodiment, this step is performed by the workflow engine 903 under the instruction of the checklist presentation controller 902.

At step 1006, the checklist instance is presented to the user. In one embodiment, the checklist presentation controller 902 presents the checklist instance loaded from a checklist file or a checklist instance retrieved from a database to a client browser of the user in the form of a portlet through the network.

At step 1007, the user executes a workflow operation. In one embodiment, the user executes the workflow operation on a portlet UI of the checklist displayed in the browser, including checking an activity in the checklist so as to set it to the "completed" status, or executing an activity by clicking a link in the activity entry so as to set it to the "completed" status, or un-checking the activity in the checklist so as to make it return to the "uncompleted" status.

At step 1008, the status of the activity in the database is updated. In one embodiment, after the checklist presentation controller 902 receives a workflow operation of the user from the client browser, it instructs the workflow engine 903 to set the activity in the corresponding checklist instance in the database to a corresponding status according to this operation.

At step 1009, it is determined whether the activity has a related activity or checklist. In one embodiment, the workflow engine 903 determines whether the activity has another related activity or checklist by examining the attributes of the activity in the checklist instance. If the determination result is yes (i.e., the activity has another related activity or checklist), then the process proceeds to step 1010; otherwise the process proceeds to step 1011.

At step 1010, the status of the related activity/checklist is updated or a notification for executing the related activity is sent to a related user. In one embodiment, the workflow engine 903 updates the status of the related activity or checklist or sends a notification for executing the related activity to the related user according to the relationship between the activity and the other related activity or checklist in the checklist instance.

At step 1011, it is determined whether the user has terminated workflow operations. In one embodiment, the checklist presentation controller 902 determines whether to terminate workflow operations by determining whether a request for terminating workflow operations from has been received the client browser. The request for terminating workflow operations is for example the user exiting the checklist portlet. If the determination result is yes (i.e., terminate workflow operations), then the process terminates; otherwise the process returns to step 1007, where the user will execute a new workflow operation.

In the above, the steps in the method for executing a workflow according to an embodiment of the present invention have been described. It should be pointed out that the steps presented are only examples, and not a limitation to the present invention. The method for executing a workflow according to the present invention can have more, less or different steps. Some steps can be merged together or divided into smaller steps, and the order of different steps can be changed or they can be performed in parallel.

The system and method for executing a workflow according to an embodiment of the present invention can be implemented in hardware, software or a combination thereof. The present invention can be implemented in a centralized mode in a single computer system or implemented in a distributed mode, in which different components are distributed in a number of interconnected computer systems. Any computer system or other apparatus suitable for carrying out the method described herein is applicable. In one embodiment, the system and method for executing a workflow according to an embodiment of the present invention is implemented in a combination of computer software and general computer hardware, wherein the computer program, when being loaded and executed by a processor of a computer system, controls the computer system to carry out the method for executing a workflow according to an embodiment of the present invention and constitutes a system for executing a workflow according to an embodiment of the present invention.

The present invention can be embodied in a computer program product comprising a computer usable storage medium having the computer software which contains all the features enabling the implementation of the methods described in the present description and can carry out the method when it is loaded into and executed by a processor of a computer system.

While the present invention has been shown and described specifically with reference to the preferred embodiments, those skilled in the art can understand that various changes can be made in form and detail without departing from the spirit and scope of the present invention.

What is claimed is:

1. A method for implementing a workflow, said workflow dividing a general work task of an enterprise into activities and associated relationships with respect to a plurality of participating roles in the workflow, said method comprising:
   generating a checklist file for each participating role, each checklist file stored in a first database, each checklist file specifying activities of each participating role and at least one relationship element for each activity of each participating role, wherein the at least one relationship element of a first activity in the checklist file of a first participating role of the plurality of participating roles comprises a dependency relationship selected from the group consisting of a one to many relationship, a many to one relationship, and a many to many relationship;
   generating a plurality of checklist instances, each checklist instance being stored in a second database, each checklist instance corresponding to an associated checklist file and recording a status of each activity and of each relationship element in the associated checklist;
   receiving a request from the first participating role to participate in execution of the workflow;
   responsive to the request, retrieving from the second database a first checklist instance corresponding to the checklist file of the first participating role and presenting the retrieved first checklist instance to the first participating role;
   after detecting that the first participating user has indicated having completed execution of the first activity in response to said presenting, updating the first checklist instance in the second database; and
   after said updating the first checklist instance, implementing each requirement of the dependency relationship,
   wherein the dependency relationship is selected from the group consisting of a one to many relationship, a many to one relationship, and a many to many relationship.

2. The method of claim 1,
   wherein the dependency relationship is the one to many relationship;
   wherein the one to many relationship specifies an activity in the checklist file of each participating role of at least two other participating roles of the plurality of participating roles;
   wherein completion of the first activity triggers said implementing each requirement of the dependency relationship; and
   wherein said implementing each requirement of the dependency relationship comprises notifying, after elapse of a specified time delay, the at least two other participating roles that the activity in the checklist file of each participating role of the at least two other participating roles will be executed as a consequence of the first activity having been completed.

3. The method of claim 1,
   wherein the dependency relationship is the many to one relationship;
   wherein the many to one relationship specifies an activity in the checklist file of each participating role of at least one other participating role of the plurality of participating roles and a second activity in the checklist file of a second participating role of the plurality of participating roles;
   wherein completion of the first activity and the activity in the checklist file of each participating role of the at least one other participating role triggers said implementing each requirement of the dependency relationship; and
   wherein said implementing each requirement of the dependency relationship comprises notifying, after elapse of a specified time delay, the second participating role that the second activity in the checklist file of the second participating role will be executed as a consequence of the first activity and the activity in the checklist file of each participating role of the at least one other participating role having been completed.

4. The method of claim 1,
   wherein the dependency relationship is the many to many relationship;
   wherein the many to many relationship specifies an activity in the checklist file of each participating role of at least two other participating roles of the plurality of participating roles and an activity in the checklist file of at least two other participating roles of the plurality of participating roles;

wherein completion of the first activity and the activity in the checklist file of each participating role of the at least one other participating role triggers said implementing each requirement of the dependency relationship; and wherein said implementing each requirement of the dependency relationship comprises notifying, after elapse of a specified time delay, the wherein said implementing each requirement of the dependency relationship comprises notifying, after elapse of a specified time delay, the at least two other participating roles that the activity in the checklist file of each participating role of the at least two other participating roles will be executed as a consequence of the first activity and the activity in the checklist file of each participating role of the at least one other participating role having been completed.

5. A computer system comprising a processor and a computer readable memory unit coupled to the processor, said memory unit containing software that when executed by the processor perform a method for implementing a workflow, said workflow dividing a general work task of an enterprise into activities and associated relationships with respect to a plurality of participating roles in the workflow, said method comprising:

generating a checklist file for each participating role, each checklist file stored in a first database, each checklist file specifying activities of each participating role and at least one relationship element for each activity of each participating role, wherein the at least one relationship element of a first activity in the checklist file of a first participating role of the plurality of participating roles comprises a dependency relationship;

generating a plurality of checklist instances, each checklist instance being stored in a second database, each checklist instance corresponding to an associated checklist file and recording a status of each activity and of each relationship element in the associated checklist;

receiving a request from the first participating role to participate in execution of the workflow;

responsive to the request, retrieving from the second database a first checklist instance corresponding to the checklist file of the first participating role and presenting the retrieved first checklist instance to the first participating role;

after detecting that the first participating user has indicated having completed execution of the first activity in response to said presenting, updating the first checklist instance in the second database; and after said updating the first checklist instance, implementing each requirement of the dependency relationship, wherein the dependency relationship is selected from the group consisting of a one to many relationship, a many to one relationship, and a many to many relationship.

6. A computer program product, comprising a computer readable storage device having computer software that when executed by a computer system causes the computer system to perform a method for implementing a workflow, said workflow dividing a general work task of an enterprise into activities and associated relationships with respect to a plurality of participating roles in the workflow, said method comprising:

generating a checklist file for each participating role, each checklist file stored in a first database, each checklist file specifying activities of each participating role and at least one relationship element for each activity of each participating role, wherein the at least one relationship element of a first activity in the checklist file of a first participating role of the plurality of participating roles comprises a dependency relationship;

generating a plurality of checklist instances, each checklist instance being stored in a second database, each checklist instance corresponding to an associated checklist file and recording a status of each activity and of each relationship element in the associated checklist;

receiving a request from the first participating role to participate in execution of the workflow;

responsive to the request, retrieving from the second database a first checklist instance corresponding to the checklist file of the first participating role and presenting the retrieved first checklist instance to the first participating role;

after detecting that the first participating user has indicated having completed execution of the first activity in response to said presenting, updating the first checklist instance in the second database; and after said updating the first checklist instance, implementing each requirement of the dependency relationship, wherein the dependency relationship is selected from the group consisting of a one to many relationship, a many to one relationship, and a many to many relationship.

7. A workflow data structure for managing a plurality of participating roles and a status of each participating role in a workflow, said workflow dividing a general work task of an enterprise into activities and associated relationships with respect to the participating roles, said workflow data structure comprising:

a checklist file for each participating role, each checklist file stored in a first database, each checklist file specifying activities of each participating role and at least one relationship element for each activity of each participating role, wherein the at least one relationship element of a first activity in the checklist file of a first participating role of the plurality of participating roles comprises a dependency relationship; and a plurality of checklist instances, each checklist instance being stored in a second database, each checklist instance corresponding to an associated checklist file and recording a status of each activity and of each relationship element in the associated checklist, wherein the first database and the second database are in persistent storage of a computer readable storage device, and wherein the dependency relationship is selected from the group consisting of a one to many relationship, a many to one relationship, and a many to many relationship.

8. The workflow data structure of claim 7, wherein the dependency relationship is the one to many relationship;

wherein the one to many relationship specifies an activity in the checklist file of each participating role of at least two other participating roles of the plurality of participating roles; and wherein completion of the first activity triggers notification, after elapse of a specified time delay, of the at least two other participating roles that the activity in the checklist file of each participating role of the at least two other participating roles will be executed as a consequence of the first activity having been completed.

9. The workflow data structure of claim 7, wherein the dependency relationship is a many to one relationship;

wherein the many to one relationship specifies an activity in the checklist file of each participating role of at least one other participating role of the plurality of participating roles and a second activity in the checklist file of a second participating role of the plurality of participating roles; and wherein completion of the first activity and the activity in the checklist file of each participating role of the at least one other participating role triggers notification, after elapse of a specified time delay, of the second participating role that the second activity in the checklist file of the second participating role will be executed as a consequence of the first activity and the activity in the checklist file of each participating role of the at least one other participating role having been completed.

10. The workflow data structure of claim 7,
wherein the dependency relationship is a many to many relationship;
wherein the many to one relationship specifies an activity in the checklist file of each participating role of at least one other participating role of the plurality of participating roles and an activity in the checklist file of at least two other participating roles of the plurality of participating roles; and
wherein completion of the first activity and the activity in the checklist file of each participating role of the at least one other participating role triggers notification, after elapse of a specified time delay, of the at least two other participating roles that the activity in the checklist file of each participating role of the at least two other participating roles will be executed as a consequence of the first activity and the activity in the checklist file of each participating role of the at least one other participating role having been completed.

11. The computer system of claim 5,
wherein the dependency relationship is the one to many relationship;
wherein the one to many relationship specifies an activity in the checklist file of each participating role of at least two other participating roles of the plurality of participating roles;
wherein completion of the first activity triggers said implementing each requirement of the dependency relationship; and
wherein said implementing each requirement of the dependency relationship comprises notifying, after elapse of a specified time delay, the at least two other participating roles that the activity in the checklist file of each participating role of the at least two other participating roles will be executed as a consequence of the first activity having been completed.

12. The computer system of claim 5,
wherein the dependency relationship is the many to one relationship;
wherein the many to one relationship specifies an activity in the checklist file of each participating role of at least one other participating role of the plurality of participating roles and a second activity in the checklist file of a second participating role of the plurality of participating roles;
wherein completion of the first activity and the activity in the checklist file of each participating role of the at least one other participating role triggers said implementing each requirement of the dependency relationship; and
wherein said implementing each requirement of the dependency relationship comprises notifying, after elapse of a specified time delay, the second participating role that the second activity in the checklist file of the second participating role will be executed as a consequence of the first activity and the activity in the checklist file of each participating role of the at least one other participating role having been completed.

13. The computer system of claim 5,
wherein the dependency relationship is the many to many relationship;
wherein the many to many relationship specifies an activity in the checklist file of each participating role of at least two other participating roles of the plurality of participating roles and an activity in the checklist file of at least two other participating roles of the plurality of participating roles;
wherein completion of the first activity and the activity in the checklist file of each participating role of the at least one other participating role triggers said implementing each requirement of the dependency relationship; and
wherein said implementing each requirement of the dependency relationship comprises notifying, after elapse of a specified time delay, the wherein said implementing each requirement of the dependency relationship comprises notifying, after elapse of a specified time delay, the at least two other participating roles that the activity in the checklist file of each participating role of the at least two other participating roles will be executed as a consequence of the first activity and the activity in the checklist file of each participating role of the at least one other participating role having been completed.

14. The computer program product of claim 6,
wherein the dependency relationship is the one to many relationship;
wherein the one to many relationship specifies an activity in the checklist file of each participating role of at least two other participating roles of the plurality of participating roles;
wherein completion of the first activity triggers said implementing each requirement of the dependency relationship; and
wherein said implementing each requirement of the dependency relationship comprises notifying, after elapse of a specified time delay, the at least two other participating roles that the activity in the checklist file of each participating role of the at least two other participating roles will be executed as a consequence of the first activity having been completed.

15. The computer program product of claim 6,
wherein the dependency relationship is the many to one relationship;
wherein the many to one relationship specifies an activity in the checklist file of each participating role of at least one other participating role of the plurality of participating roles and a second activity in the checklist file of a second participating role of the plurality of participating roles;
wherein completion of the first activity and the activity in the checklist file of each participating role of the at least one other participating role triggers said implementing each requirement of the dependency relationship; and
wherein said implementing each requirement of the dependency relationship comprises notifying, after elapse of a specified time delay, the second participating role that the second activity in the checklist file of the second participating role will be executed as a consequence of the first activity and the activity in the checklist file of each participating role of the at least one other participating role having been completed.

16. The computer program product of claim 6,
wherein the dependency relationship is the many to many relationship;

wherein the many to many relationship specifies an activity in the checklist file of each participating role of at least two other participating roles of the plurality of participating roles and an activity in the checklist file of at least two other participating roles of the plurality of participating roles;

wherein completion of the first activity and the activity in the checklist file of each participating role of the at least one other participating role triggers said implementing each requirement of the dependency relationship; and wherein said implementing each requirement of the dependency relationship comprises notifying, after elapse of a specified time delay, the wherein said implementing each requirement of the dependency relationship comprises notifying, after elapse of a specified time delay, the at least two other participating roles that the activity in the checklist file of each participating role of the at least two other participating roles will be executed as a consequence of the first activity and the activity in the checklist file of each participating role of the at least one other participating role having been completed.

* * * * *